__United States Patent__ [19]

Nudelman

[11] __3,907,788__

[45] __Sept. 23, 1975__

[54] SULFENYL DERIVATIVES OF 7-AMINOCEPHALOSPORANIC ACID

[75] Inventor: Abraham Nudelman, Rehovot, Israel

[73] Assignee: American Home Products Corporation, New York, N.Y.

[22] Filed: Mar. 1, 1974

[21] Appl. No.: 447,414

[52] U.S. Cl.............................. 260/243 C; 424/246
[51] Int. Cl.² ........................................ C07D 501/18
[58] Field of Search ................................ 260/243 C

[56] References Cited
UNITED STATES PATENTS
3,828,037  8/1974  De Marinis .................... 260/243 C

*Primary Examiner*—Nicholas S. Rizzo
*Attorney, Agent, or Firm*—David E. Frankhouser

[57] ABSTRACT

Sulfenyl derivatives of 7-aminocephalosporanic acid are prepared by the reaction of 7-aminocephalosporanic acid with an alkyl-, trihaloalkyl-, or aralkylsulfenyl halide. The products have antibacterial activity.

4 Claims, No Drawings

SULFENYL DERIVATIVES OF 7-AMINOCEPHALOSPORANIC ACID

The invention for which a patent is sought comprises chemical compounds of the formula:

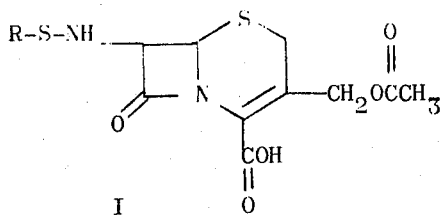

I wherein R is lower alkyl, trihalomethyl, benzyl, phenethyl, or a benzyl or phenethyl group in which the benzene ring thereof is substituted with a nitro, halogen, cyano, or lower alkyl group, and the salts thereof.

By "lower alkyl" is meant an alkyl group having from 1 to 4 carbon atoms, e.g. methyl, ethyl, propyl, isopropyl, butyl, isobutyl, or t-butyl. By "halo" or "halogen" is meant a chlorine, bromine, iodine, or fluorine atom.

The salts of the compounds of Formula I are those made by reaction of the carboxylic acid moiety thereof with a suitably strong base. Among the salts contemplated are the alkali metal salts (e.g. sodium or potassium), alkali earth metal salts (e.g. calcium, magnesium, or barium) or organic salts, such as ammonia, trialkylamine, or N-methylmorpholine salts.

Special mention is made of the following specific embodiments:

7-(1,1,1-trichloromethanesulfenamido)-cephalosporanic acid;

7-(1,1,1-trifluoromethanesulfenamido)-cephalosporanic acid; and 7-(α-toluenesulfenamido)cephalosporanic acid; and the salts thereof.

The compounds of the invention possess anti-bacterial activity as demonstrated by standard in vitro bacteriological test procedures. The compounds can therefore be used to control the growth of bacteria that are sensitive to the particular compound employed.

The compounds of the invention are prepared by the interaction of 7-aminocephalosporanic acid, with a sulfenyl halide of the formula:

RSX;

wherein R has the meanings as set forth hereinabove, and X is a chlorine or bromine atom; in the presence of a base (e.g. triethylamine). The condensation reaction is carried out in a reaction-inert organic solvent (e.g. dichloromethane) at a temperature of about 0°C.

The method of preparation of the compounds of Formula I and the method for eliciting the antibacterial activity thereof are illustrated in the following examples:

EXAMPLE I 7-(1,1,1-Trichloromethanesulfenamido)-Cephalosporanic Acid

To a solution of 7-aminocephalosporanic acid (2.72 g, 0.01 moles) and triethylamine (2.02 g, 0.02 moles) in 100 ml of dichloromethane, trichloromethylsulfenyl chloride (1.86 g, 0.01 moles) is added. The reaction mixture is stirred at ice temperature for 0.5 hours. It is then washed with 3N hydrochloric acid and water, dried over magnesium sulfate, flash concentrated to 10 ml and precipitated into pentane. The title compound (2.46 g, 58 percent yield), decomposes when heated. NMR: (DMSO-$D_6$) ppm δ 2.03 (s,3), 3.54 (broad s, 2), 4.85 (q, 2), 5.07 (d, 1), 5.38 (d, 1).

Analysis for: $C_{11}H_{11}N_2Cl_3O_5S_2$ Calculated: C, 31.33; H, 2.63; N, 6.64; Cl, 25.22; S, 15.21 Found: C, 32.17; H, 2.99; N, 6.64; Cl, 24.99; S, 14.83

EXAMPLE II 7-(1,1,1-Trifluoromethanesulfenamido)-Cephalosporanic Acid

The title compound is prepared by a similar procedure as that of Example 1 from trifluoromethanesulfenyl chloride (1.82 g, 0.0133 mole), 7-aminocephalosporanic acid (3.62 g, 0.0133 mole) and triethylamine (2.69 g, 0.0266 mole). The product obtained (1.6 g, 32 percent yield) decomposes when heated. NMR: ($DCCl_3$) ppm δ 2.10 (s, 3), 3.52 (broad s, 2), 4.9–5.2 (broad band 4).

Analysis for: $C_{11}H_{11}N_2F_3O_5S_2$ Calculated: C, 35.48; H, 2.98; N, 7.53 Found: C, 36.10; H, 3.20; N, 7.14

EXAMPLE III 7-(α-Toluenesulfenamido)Cephalosporanic Acid

The title compound is prepared as described in Example I from α-toluenesulfenyl bromide, 7-aminocephalosporanic acid and triethyl amine. The product obtained (15 percent yield) decomposes when heated. NMR: ($DCCl_3$) ppm δ 2.08 (s, 3), 3.4 (broad s, 2), 4.20 (s, 2), 4.53 (q, 2), 5.1 (q, 2), 7.3 (s, 5). The product contains 0.25 mole of dibenzyl disulfide.

Analysis for: $C_{17}H_{18}N_2S_2O_5 \cdot 0.25\ C_{14}H_{14}S_2$ Calculated: C, 53.99; H, 4.75; N, 6.14; S, 17.58 Found: C, 54.07; H, 4.62; N, 6.16; S, 17.24

EXAMPLE IV

The in vitro antibacterial activity of the compounds of the invention can be demonstrated by the agar serial dilution test as described below:

A stock solution of the test compound in sterile 1% phosphate buffer, pH 7, at a concentration 2500 μg/ml is prepared. Two-fold dilutions of the stock solution are made by adding appropriate amounts of the buffer solution. One-ml. quantities of each dilution are incorporated into seed agar in sterile petri dishes to give plates containing varying concentrations of the test compound. The hardened surface of each plate is inoculated with the test organism and the plates are incubated for 18 hours at 35°C. The in vitro activity of the compound tested is expressed as the "minimal inhibitory concentration" (MIC) which is defined as the least amount of material (μg/ml) that completely inhibits the test organism.

When tested according to the aforedescribed procedure, the compounds described in Examples I, II, and III gave the following results:

|  |  | MIC (µg/ml.) Compound | | |
|---|---|---|---|---|
|  |  | Example I | Example II | Example III |
| Bacillus subtilis | 6633 | 3.90 | 15.6 | 31.3 |
|  | 6538P | 15.6 | 3.9 | 31.3 |
| Staphylococcus aureus |  |  |  |  |
| Staphylococcus aureus | Smith | 15.6 | 3.9 | 31.3 |
| Staphylococcus aureus | CHP | 31.3 | 15.6 | 62.5 |
| Staphylococcus aureus | 53–180 | 31.3 | 7.81 | 62.5 |
| Mycobacterium smegmatis | 10143 | NA | NA | NA |
| Neisseria catarrhalis | 8193 | 125 | 250 | NA |
| Pseudomonas aeruginosa | 10145 | NA | NA | NA |
| Escherichia coli | 9637 | 62.5 | NA | NA |
| Escherichia intermedia | 65–1 | 125 | NA | NA |
| Salmonella paratyphi | 11737 | 31.3 | NA | NA |
| Enterobacter aerogenes | 13048 | 125 | NA | NA |
| Klebsiella pneumoniae | 10031 | 62.5 | 250 | NA |
| Bordetella bronchiseptica | 4617 | 125 | 125 | 250 |
| Proteus vulgaris | 6896 | 125 | 125 | 125 |
| Herellea sp. | 9955 | 62.5 | 250 | 250 |

NA = not active up to 250 µg/ml.

What is claimed is:
1. A compound of the formula:

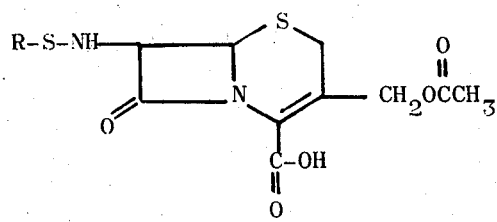

wherein R is lower alkyl, trihalomethyl, benzyl, phenethyl, or a benzyl or phenethyl group in which the benzene ring thereof is substituted with a nitro, halogen, cyano, or lower alkyl group, and the alkali metal, alkali earth metal, or ammonia salts thereof.

2. A compound as defined in claim 1 which is 7-(1,1,1-trichloromethanesulfenamido)cephalosporanic acid.

3. A compound as defined in claim 1 which is 7-(1,1,1-trifluoromethanesulfenamido)cephalosporanic acid.

4. A compound as defined in claim 1 which is 7-(α-toluenesulfenamido)cephalosporanic acid.

* * * * *